UNITED STATES PATENT OFFICE.

JAMES H. DILKS, OF NEW YORK, N. Y., ASSIGNOR TO C. T. RAYNOLDS & CO., OF SAME PLACE.

IMPROVED PROCESS OF MAKING SOLUBLE BLUING FOR USE IN LAUNDRIES AND BLEACHING.

Specification forming part of Letters Patent No. 72,817, dated December 31, 1867.

*To all whom it may concern:*

Be it known that I, JAMES H. DILKS, of the city, county, and State of New York, have invented a new and Improved Process for Making a Soluble Prussian Blue for Laundry and Bleaching Purposes; and I do hereby declare that the following is a description of my invention sufficient to enable those skilled in the art to practice it.

My invention relates to the production, for laundry, bleaching, and other purposes, of a soluble Prussian, Paris, or Chinese blue by a new process, the leading features of which are that no oxalic acid is used in its preparation, nor is there (as is usual in the blue as heretofore prepared) an excess of prussiate of potash, that it is perfectly soluble both in the lump form and in a powdered state, either in soft or in hard water.

To enable others skilled in the art to make a blue in accordance with my new process, I will proceed to describe the same.

1. I first dissolve in, say, about one hundred (100) gallons of cold water one hundred (100) pounds of ferrocyanide of potassium, and then add about forty pounds of sulphuric acid. I designate this as "mixture No. 1."

2. I dissolve ten (10) pounds of iron in forty (40) pounds of nitric acid. I designate this as "mixture No. 2."

3. I now add the above mixture No. 2 to the mixture No. 1, and boil the whole until a violent action takes place, and then wash the same free from acid, and afterward press and dry it in the form required.

The advantages of this new process are as follows: It yields a blue whose freedom from oxalic acid enables me to form it into pressed lumps or other portable forms, as hereinafter described. Again, this blue is absolutely soluble, and when applied to water parts freely with the coloring-matter and diffuses it equally throughout the liquid, and does not allow that irregular and unequal diffusion, the effect of which is to spot and smut the goods, as when the ordinary Prussian, Chinese, or Paris blue of commerce in the powdered state is used.

To put my new mixture in the form of lumps, which is the preferable (though not a necessary) form, because of its being more convenient and economical, and less liable to be lost and wasted, I press the composition while damp into lumps or cakes of any desired form or size, and then dry them. Sizing may or may not be used, according to the quality of the blue under treatment.

This blue may, however, be made and used either in the lump form or in the powdered state, at option, and is absolutely soluble in either form, and, being free from acid, it will not injure any fabric. It can be used for the same purposes as the ordinary blues above mentioned, and admits of being put up in any form found most desirable for market, for transportation, or for use.

I do not confine myself to the precise proportions above stated, as it is evident that variations therefrom may be made, dependent upon circumstances and the quality of the materials used, without departing from my invention.

What I claim, and desire to secure by Letters Patent, is—

The process, substantially as above described, of making soluble Prussian, Paris, or Chinese blue in lumps or powder.

JAMES H. DILKS.

Witnesses:
CHARLES LILLIE,
WM. H. CROUT, Jr.